(12) United States Patent
Weber et al.

(10) Patent No.: US 11,760,172 B2
(45) Date of Patent: Sep. 19, 2023

(54) COMPOSITE PANE WITH ELECTRICALLY SWITCHABLE FUNCTIONAL ELEMENT IN THERMOPLASTIC INTERMEDIATE LAYER

(71) Applicant: SAINT-GOBAIN GLASS FRANCE, Courbevoie (FR)

(72) Inventors: Patrick Weber, Alsdorf (DE); Ali-Osman Kizmaz, Würselen (DE); Sara Borhani Haghighi, Aachen (DE); Alexandra Yatim, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/050,296

(22) PCT Filed: Apr. 17, 2019

(86) PCT No.: PCT/EP2019/059969
§ 371 (c)(1),
(2) Date: Oct. 23, 2020

(87) PCT Pub. No.: WO2019/206772
PCT Pub. Date: Oct. 31, 2019

(65) Prior Publication Data
US 2021/0229531 A1 Jul. 29, 2021

(30) Foreign Application Priority Data
Apr. 25, 2018 (EP) .................................. 18169154

(51) Int. Cl.
*B60J 1/02* (2006.01)
*B60J 1/00* (2006.01)
(Continued)

(52) U.S. Cl.
CPC .......... *B60J 1/001* (2013.01); *B32B 17/10036* (2013.01); *B32B 17/1077* (2013.01);
(Continued)

(58) Field of Classification Search
CPC ...... B60J 1/001; B60J 1/08; B60J 1/18; B32B 17/10036; B32B 17/10192;
(Continued)

(56) References Cited

U.S. PATENT DOCUMENTS 10,525,673 B2  1/2020  Weber et al.
2004/0227462 A1  11/2004  Utsumi et al.
(Continued)

FOREIGN PATENT DOCUMENTS

DE  10 2008 026339 A1  12/2009
DE  20 2008 017 611 U1  5/2010
(Continued)

OTHER PUBLICATIONS

International Search Report as issued in International Patent Application No. PCT/EP2019/059969, dated Jul. 18, 2019.
(Continued)

*Primary Examiner* — Megha M Gaitonde
(74) *Attorney, Agent, or Firm* — Pillsbury Winthrop Shaw Pittman LLP

(57) ABSTRACT

A composite pane with an electrically switchable functional element, includes first and second panes, a thermoplastic intermediate layer joining the first pane to the second pane and including a first laminating film with a thickness of at least 0.3 mm and a second laminating film with a thickness of at most 70 μm. The first laminating film is inserted substantially areally between the first and second panes. The second laminating film is inserted exclusively in the region of the at least one functional element and protrudes with an overhang x of at least 1 mm and at most 10 mm beyond the outer edges of the functional element. The direct layer sequence in the region of an electrically switchable functional element consists of the first pane, the second laminating film, the electrically switchable functional element,
(Continued)

Figure 1A:
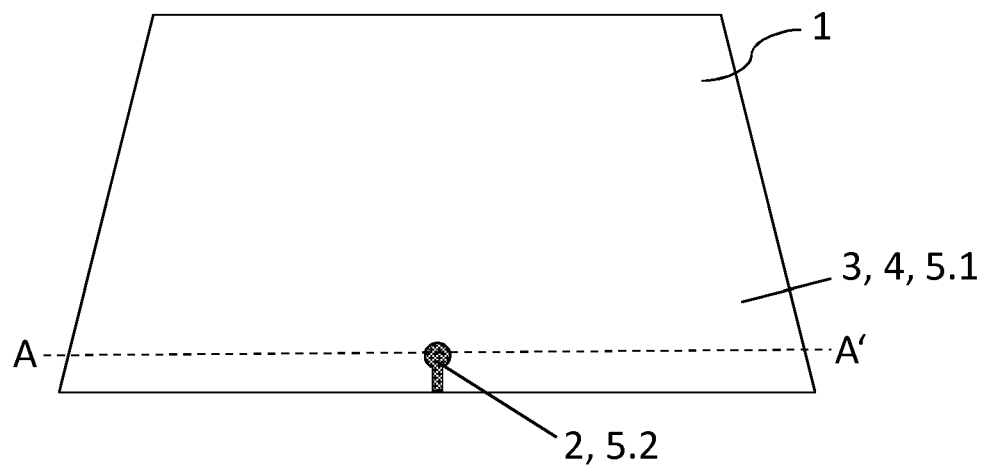

optionally, a further second laminating film, the first laminating film, and the second pane.

20 Claims, 3 Drawing Sheets

(51) Int. Cl.
*B32B 17/10* (2006.01)
*B60J 1/08* (2006.01)
*B60J 1/18* (2006.01)

(52) U.S. Cl.
CPC .. *B32B 17/10192* (2013.01); *B32B 17/10293* (2013.01); *B32B 17/10504* (2013.01); *B32B 17/10513* (2013.01); *B32B 17/10532* (2013.01); *B32B 17/10761* (2013.01); *B32B 17/10788* (2013.01); *B60J 1/08* (2013.01); *B60J 1/18* (2013.01); *B32B 2605/00* (2013.01)

(58) Field of Classification Search
CPC ........ B32B 17/10293; B32B 17/10504; B32B 17/10513; B32B 17/10532; B32B 17/10761; B32B 17/1077; B32B 17/10788; B32B 2605/00; Y10T 428/24752; Y10T 428/24777; Y10T 428/24942; Y10T 428/2495; Y10T 428/24959; Y10T 428/24967
USPC ........ 428/189, 192, 212, 213, 214, 215, 220
See application file for complete search history.

(56) References Cited

U.S. PATENT DOCUMENTS

| | | |
|---|---|---|
| 2012/0026573 A1 | 2/2012 | Collins et al. |
| 2015/0165965 A1 | 6/2015 | Masaki et al. |
| 2015/0202846 A1* | 7/2015 | Byker ..................... C23C 14/35 204/192.27 |
| 2015/0367782 A1 | 12/2015 | Mannheim et al. |
| 2016/0312523 A1* | 10/2016 | Miyasaka ......... B32B 17/10036 |
| 2016/0313587 A1 | 10/2016 | Linthout et al. |
| 2018/0009198 A1* | 1/2018 | Weber ............... B32B 17/10036 |
| 2018/0281570 A1 | 10/2018 | Labrot et al. |

FOREIGN PATENT DOCUMENTS

| | | |
|---|---|---|
| EP | 0 876 608 B1 | 4/2002 |
| EP | 0 847 965 B1 | 10/2004 |
| EP | 1 862 849 A1 | 12/2007 |
| EP | 2 139 049 A1 | 12/2009 |
| EP | 2 200 097 A1 | 6/2010 |
| EP | 2 399 735 A1 | 12/2011 |
| EP | 2 462 007 B1 | 6/2016 |
| JP | 2009-200851 A | 9/2009 |
| JP | 2009-534283 A | 9/2009 |
| JP | 2018-509361 A | 4/2018 |
| WO | WO 2007/122428 A1 | 11/2007 |
| WO | WO 2007/122429 A1 | 11/2007 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2012/052315 A1 | 4/2012 |
| WO | WO 2013/104438 A1 | 7/2013 |
| WO | WO 2013/104439 A1 | 7/2013 |
| WO | WO 2014/174310 A1 | 10/2014 |
| WO | WO 2016/116372 A1 | 7/2016 |
| WO | WO 2017/077133 A1 | 5/2017 |
| WO | WO 2017/097536 A1 | 6/2017 |
| WO | WO 2017/157626 A1 | 9/2017 |
| WO | WO 2018/010865 A1 | 1/2018 |
| WO | WO 2018/041472 A1 | 3/2018 |

OTHER PUBLICATIONS

Notice of Reasons for Rejection as issued in Japanese Patent Application No. 2020-558953, dated Feb. 1, 2022.
First Office Action as issued in Chinese Patent Application No. 201980001311.0, dated Jun. 22, 2022.

* cited by examiner

COMPOSITE PANE WITH ELECTRICALLY SWITCHABLE FUNCTIONAL ELEMENT IN THERMOPLASTIC INTERMEDIATE LAYER

CROSS-REFERENCE TO RELATED APPLICATIONS

This application is the U.S. National Stage of PCT/EP2019/059969, filed Apr. 17, 2019, which in turn claims priority to European patent application number filed 18 169 154.4 filed Apr. 25, 2018. The content of these applications are incorporated herein by reference in their entireties.

The invention relates to a composite pane with an electrically switchable functional element embedded in the thermoplastic intermediate layer of the composite pane, a method for producing the composite pane, and the use of the composite pane as a motor vehicle window pane.

Modern glazing systems are equipped with various electrically controllable functional elements, such as sensors, detectors, or receiver units. Examples of such functional elements, in particular in the automotive sector, include rain sensors, antennas, and capacitive touch sensors. These functional elements should usually be as inconspicuous as possible for the observer and, if optically perceptible, be designed as attractively as possible. At the same time, the components must be protected against weathering and environmental influences.

EP 2 462 007 B1 describes a composite pane with an optically transparent sensor field and a sensor installed in the region of the sensor field. The sensor is situated within an encapsulation that protrudes into the passenger compartment of a motor vehicle. This encapsulation is visible in the passenger compartment as an elevation on the pane and is perceived by the driver as potentially distracting and limiting the field of vision.

Depending on the type and size of the sensors necessary, they can even be inserted into the laminate of the composite pane. Thus, known from WO 2017/097536 is a light sensor that includes a photodiode and a circuit board and is inserted between a glass pane and the thermoplastic intermediate layer of the laminated composite pane adjacent thereto. The circuit board of the photodiode has no adhesion to the adjacent glass, as a result of which visually discernible air inclusions persist between these layers. This can be concealed by an opaque masking print.

WO 2016/116372 discloses a composite pane with a touch sensor in the form of a capacitive switching region for controlling any electrical loads in the vehicle, such as optically active switchable glazings. The capacitive sensor includes a patterned electrically conductive layer on a carrier film. The carrier film is inserted between two thermoplastic intermediate layers of the composite pane. However, with such a symmetrical structure, it must be ensured that the sensor can be switched only selectively from one pane surface of the composite pane. In order to improve selectivity, the thickness of the thermoplastic intermediate layer can be increased on the side on which no switchability of the sensor surface is desired by interposition of an additional ply of material of the intermediate layer. This additional ply of the thermoplastic intermediate layer is inserted into the pane composite substantially over the entire surface in order to keep the local differences in thickness as small as possible in the region of the sensors.

Functional elements for electrically switchable glazings, such as PDLC or SPD elements, are usually laminated into a composite pane via two thermoplastic composite films of the same thickness. According to WO 2007/122428 A1, to compensate for the difference in thickness between regions with a functional element and regions without a functional element, a thermoplastic frame film that is inserted between the two thermoplastic composite films (also referred to as laminating films) and surrounds the functional element in a frame-like manner along its peripheral edge can be used. For example, in WO 2007/122428 A1, two thermoplastic bonding films made of PVB with a thickness of 0.76 mm and a frame film made of PVB with a thickness of 0.38 mm are used to integrate an SPD element into a composite pane. WO 2007/122429 A1 describes said structure for liquid-crystal-based functional elements. As a result of the areal use of the thermoplastic laminating films and likewise large-area frame film, a disadvantageously high thickness of the composite pane is obtained.

US 2015/0165965 A1 discloses a composite pane including an SPD functional element and a diode that are embedded in the thermoplastic intermediate layer of the composite pane. For this, a multilayer structure of the intermediate layer comprising multiple frame films is necessary.

US 2016/0313587 A1 describes a composite pane with a functional element laminated therein, wherein a plurality of thermoplastic laminating films with a thickness in each case of 0.76 mm, 0.38 mm, and a combination of these two thicknesses are used.

WO 2018/041472 A1 describes a windshield for a head-up display that is equipped with an infrared reflecting coating on a polyester film, wherein the polyester film is embedded between two thermoplastic laminating films of different thickness. The thicknesses of the inner pane and of the thermoplastic laminating films are selected such that the distance between the infrared reflecting coating and the outer side of the inner pane is reduced compared to the customary dimensions. This ensures improved overlapping of the primary reflection and the layer reflection of the HUD image. The thermoplastic laminating films as well as the polyester film are embedded in the composite pane over its entire area.

WO 2018/010865 A1 discloses a composite pane including a thermoplastic intermediate layer made of two thermoplastic laminating films of different thickness and a polyester film inserted between the laminating films, as well as a method for producing such a composite pane. In particular, thermoplastic intermediate layers made of a thick laminating film (PVB), a thinner laminating film (PVB), and a polyester film inserted therebetween are used. The laminating film of lower thickness offers the advantage that it can be detached more easily in a short time during the production process to enable a selective trimming of the polyester film. The thermoplastic laminating films as well as the polyester film are embedded in the composite pane over its entire area.

The object of the present invention is to provide a composite pane with an electrically switchable functional element laminated into the thermoplastic intermediate layer, wherein the functional element is optically inconspicuously integrated into the film composite. The object of the invention is, moreover, to make available a method for producing such a composite pane.

The object of the present invention is accomplished according to the invention by a composite pane with an electrically switchable functional element embedded in the thermoplastic intermediate layer in accordance with the independent claim 1. Preferred embodiments emerge from the subclaims.

The composite pane according to the invention with at least one electrically switchable functional element comprises at least a first pane, a second pane, and a thermoplastic intermediate layer that joins the first pane to the second pane. The thermoplastic intermediate layer comprises a first laminating film with a thickness of at least 0.3 mm and one or a plurality of second laminating films with a thickness in each case of at most 70 µm. The first laminating film serves for the areal joining of the first pane and the second pane to form a composite pane. The second laminating films are, on the other hand, significant for the visually attractive integration of the functional element. In the region of the electrically switchable functional element, there is a direct layer sequence of a first pane, first laminating film, second laminating film, electrically switchable functional element, optionally, a further second laminating film, and, finally, the second pane. The functional element is thus bonded to the adjacent first pane via a second laminating film. In a possible embodiment, only the first laminating film is situated between the functional element and the second pane. In another possible embodiment, an additional second laminating film is inserted adjacent the functional element such that the bonding of the functional element to the second pane is done via a second laminating film and the first laminating film following that. The second laminating films are situated exclusively in the region of the functional element or of the functional elements and protrude with an overhang x of at least 1 mm and at most 10 mm beyond the outer edges of the functional element. Thus, the structure of the thermoplastic intermediate layer outside the functional element is unaffected. The layer sequence described is realized according to the invention with functional elements that have a thickness of at most 200 µm and a share of the total area of the glazing of less than 10%.

The inventors were able to establish that the layer structure according to the invention is, in particular, suited for integrating functional elements that are correspondingly locally limited and have a low thickness. In this case, it is found that with use of the thin second laminating films in the region of the functional element, only slight additional local stresses occur in the glass and, at the same time, a visually attractive edge appearance can be achieved.

The layer structure according to the invention with only locally limited second laminating film thus enables dispensing with complex structures such as frame films. At least within the part of the field of vision of the composite pane that is located outside all functional elements and outside the corresponding overhangs x, the direct layer sequence of the composite pane thus consists of the first pane, the first laminating film, and the second pane. This is particularly preferably true for the entire composite pane outside all functional elements and outside the corresponding overhangs x. The composite pane according to the invention does not include any frame films at all.

The first laminating film can, if need be, be composed of a plurality of individual, congruent, full-surface thermoplastic films. This is, for example, advantageous when the desired thickness of the first laminating film is an integer multiple of the thickness of a commercially available film with a standard thickness.

The composite pane according to the invention enables a particularly attractive appearance of the functional element, since the functional element is completely surrounded by laminating films, which, due to their thermoplastic properties enable adhesion to the adjacent glass panes.

When the functional element is placed, according to the prior art, directly on a first pane and laminated to a second pane with the interposition of only a first laminating film, there is no adhesion to the first pane. This is discernible in the laminated composite pane in the form of air inclusions between the functional element and the glass. Moreover, the transition between the functional element and the adjacent region without a functional element is visible in the laminate as a clearly discernible edge. This effect occurs on both sides, in other words, both on the side of the first pane and on the side of the second pane, despite the interposition of the first laminating film.

The inventors have found that the use of a second laminating film locally in the region of the functional element both improves the adhesion between the functional element and the adjacent pane and also conceals the optically visible edge of the functional element. Air inclusions are thus completely avoided. It is even possible to dispense with a black print that covers the outer edge of the functional element and the aforementioned appearance of an edge. Consequently, it is possible to mount the functional element at any position within the composite pane according to the invention, since no consideration has to be given for negative visual impact due to edge effects or black print. It is possible to dispense with complex solutions such as the use of frame films for the integration of functional elements. The cutout of a frame film is, moreover, visible in reflection. In contrast, the solution according to the invention is superior. The composite pane according to the invention is also advantageous in terms of weight optimization of glazings. As a result of the fact that the second laminating films are used only locally in the region of the functional elements, a weight reduction is possible compared to a composite pane with a plurality of areal laminating films. Since the second laminating films have, according to the invention, a thickness of at most only 70 µm, the resultant stresses can be kept below despite a local increase in thickness of the composite pane. Thus, damage to the composite pane caused by excessively high stresses is avoided.

Preferably, the thermoplastic intermediate layer consists of a first laminating film and one or a plurality of second laminating films.

The second laminating films can be inserted in the thermoplastic intermediate layer both between a functional element and an adjacent pane as well as between a functional element and an adjacent first laminating film. Positioning between a functional element and a pane results in an improvement in adhesion, avoidance of air inclusions, and improvement of the edge appearance of the functional element. Between the first laminating film and the functional element, the second laminating film serves only for improving the edge appearance.

In a preferred embodiment of the invention, the thermoplastic intermediate layer consists of the first laminating film applied areally and, in addition, in each case, exactly one second laminating film per electrically switchable functional element. The direct sequence in the region of the electrically switchable functional element or elements is as follows: first pane, second laminating film, electrically switchable functional element, first laminating film, and second pane. The second laminating films are inserted only locally in the region of the functional elements, between them and the adjacent pane. The number of second laminating films corresponds to the number of functional elements. Defined as a second laminating film is a film section corresponding to a functional element. A plurality of second laminating films can also be connected to one another. If, for example, two functional elements are arranged directly next to one another, a separating cut between the second laminating films of the functional elements can be dispensed with and the two films could be inserted into the thermoplastic intermediate layer as a common film section. This applies both to the second laminating films between a functional element and a pane and to the second laminating films between a functional element and a first laminating film.

In another preferred embodiment of the invention, the thermoplastic intermediate layer consists of the first laminating film and, in each case, two second laminating films per electrically switchable functional element that is inserted into the intermediate layer. The direct layer sequence in the region of the electrically switchable functional element accordingly consists of the first pane, a second laminating film, the electrically switchable functional element, an additional second laminating film, the first laminating film, and the second pane. The number of the second laminating films is, accordingly, twice the number of functional elements. According to the invention, air bubbles between the first pane and the functional element are avoided and the edge appearance from the first pane side is improved. Additionally, an improvement of the edge appearance when looking through the composite pane from the second pane side is achieved for the second pane.

The inner surface of the first pane of the composite glass according to the invention (or the composite pane) is the surface of the first pane turned in the direction of the thermoplastic intermediate layer, while the outer surface of the first pane is oriented, in the installed position, toward the vehicle interior or building interior. The inner surface of the second pane is likewise oriented toward the thermoplastic intermediate layer; whereas, in contrast, the outer surface of the second pane points toward the external environment. The first and the second pane contain glass and/or transparent plastics, such as polycarbonate or polymethyl methacrylate. Preferably, the panes are made of glass. In principle, any number of additional panes can be arranged on the outer surfaces of the first and the second pane and joined thereto by lamination with interposition of thermoplastic films or even via spacers in the case of an insulating glazing unit. When, for example, the functional element is a touch sensor, the pane via which the sensor is to be operated must be provided as an outer pane on which no further panes are to be mounted. In general, the pane nearest the sensor is used for triggering the sensor function.

The first laminating film and the second laminating film are thermoplastic films that are suitable for producing for an adhesive bond to one another and to adjacent panes and/or to adjacent functional elements. During the lamination operation, the first laminating film and the second laminating film begin to flow under the action of heat, as a result of which they adhere to adjacent elements and are bonded thereto and to one another. Preferably, the first and the second laminating film contain polyvinyl butyral (PVB), ethylene vinyl acetate (EVA), and/or polyurethane (PU). These materials are common for the thermoplastic intermediate layer of composite panes and produce an adhesive bond to glass. Thus, a good bond is ensured. In the composite pane as a finished laminated end product, the individual films remain identifiable as such despite melting during the lamination operation. In particular, the material flows at the edges of the films during the lamination operation; however, complete mixing does not occur such that in the product, the individual film sections and their composition (e.g., plasticizer content) are still detectable.

According to the invention, the thickness of the first laminating film (at least 0.3 mm) is significantly greater than the thickness of the second laminating film (at most 70 µm in each case). The first laminating film should have an appropriate thickness for securely bonding the first panes and the second pane. Local unevenness can be reliably compensated for by means of an areally applied first laminating film of this minimum thickness. For the second laminating film, on the other hand, a thin film according to the invention must be applied in order to keep the local increase in thickness as low as possible in the region of the functional element.

The thinner the second laminating film, the more effectively a thickness offset along the composite edge can be avoided; however, thermoplastic films are not producible arbitrarily thinly. The harder a thermoplastic film, the thinner it can be produced, in particular, extruded. Consequently, the second laminating film preferably has the least possible amount of plasticizer, in order to be able to produce it as thin as possible. Customary thermoplastic films, in particular those made of PVB, have a plasticizer content of at least 15 wt.-%. The second laminating film preferably has a comparatively reduced value. Preferably, the second laminating film includes a plasticizer content of less than 15 wt.-%, particularly preferably less than 10 wt.-%, most particularly preferably less than 5 wt.-%, and is, in particular, substantially plasticizer-free. The first laminating film with a thickness of at least 0.3 mm preferably includes a plasticizer content of at least 15 wt.-%. The first laminating film and the second laminating films are preferably based on the same polymer but differ, as mentioned, in plasticizer content.

The second laminating film preferably has a thickness of 10 µm to 70 µm, particularly preferably of 25 µm to 70 µm, in particular of 40 µm to 60 µm, for example, approx. 50 µm. Good results can thus be achieved in terms of the reduction of mechanical stresses.

The thickness of two overlappingly applied second laminating films is, in total, at most 140 µm. Preferably, this amounts, in total, to at most 100 µm. When multiple films are used overlappingly, for example, in the case of two second laminating films in the region of a functional element, it is desirable to reduce the thickness of the individual films in order to achieve the least possible total offset.

The first laminating film has a thickness of 0.30 mm to 1.5 mm, preferably 0.35 mm to 1.0 mm, particularly preferably 0.35 mm to 0.8 mm. PVB films are, for example, offered in standard thicknesses of 0.38 mm and 0.76 mm.

The functional elements have a thickness of at most 200 µm, preferably 50 µm to 200 µm, particularly preferably 50 µm to 150 µm. This dimension is advantageous for reducing the risk of undesirable stress cracks. Typical functional elements in automotive glazings occupy an area share of 0.5% to 10%, preferably 1% to 5%, for example, 2.5% of the total glazing area. The edge length of the functional elements, from which, together with the desired overhang x, the area of the second laminating film results, is usually at most 20 cm×20 cm, preferably at most 15 cm×15 cm, particularly preferably at most 10 cm×10 cm. The glazing region with a locally increased thickness therefore extends over a comparatively small area of the glazing such that also, as a result, the risk of glass breakage is minimized.

The second laminating films are, according to the invention, inserted in the composite pane only locally in the region of the functional elements and protrude circumferentially at least 1 mm and at most 10 mm beyond the outline of the functional element. Compared to a full-surface use of the second laminating films, this yields a weight and cost advantage. Moreover, in particular in the case of a large thickness offset between the region of the functional element and the rest of the composite pane, it is advantageous to create a gradual transition between these regions. In a possible embodiment, a smaller overhang is selected, preferably of 1 mm to 5 mm, particularly preferably of at most 1 mm to 4 mm, in particular of 2 mm to 3 mm. The inventors have established that the concealment of the edge appearance of the functional element is substantially improved when the second laminating films are applied to the functional element with such a small overhang. The fact that an overhang of the second laminating films results in a significantly greater improvement than a congruent positioning was surprising and unexpected for the inventors.

The electrically switchable functional element can assume a large variety of forms known to the person skilled in the art. These include, for example, a sensor, an antenna, an SPD, a PDLC, an electrochromic, or an electroluminescent functional element. The composite pane according to the invention can even have a plurality of electrically switchable functional elements, with the possibility of these also having different designs and functions. Particularly preferably, the electrically switchable functional element includes a non-thermoplastic carrier film. In particular, the carrier film is a polyester film, for example, a polyethylene terephthalate film. These films have no adhesion at all to glass, which leads to air inclusions between the carrier film and an adjacent glass pane. The invention remedies this.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

A PDLC (polymer dispersed liquid crystal) functional element contains an active layer including liquid crystals that are embedded in a polymer matrix. When no voltage is applied to the surface electrodes, the liquid crystals are randomly oriented, resulting in strong scattering of the light passing through the active layer. When a voltage is applied to the surface electrodes, the liquid crystals align themselves in one common direction and the transmittance of light through the active layer is increased. Such a functional element is known, for example, from DE 102008026339 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any representations can be shown. The present invention is particularly suitable for integrating electroluminescent functional elements, in particular OLED displays in a composite pane. OLED displays usually have a carrier film made of non-thermoplastic material which establishes no adhesion to the panes during the lamination operation. In this case, adhesive bonding of the elements via the second laminating film according to the invention is particularly advantageous.

In another particularly preferred embodiment of the invention, the electrically switchable functional element is a sensor, in particular a touch sensor. The composite pane according to the invention is particularly suitable for accommodating sensors as functional elements, since an asymmetric incorporation of the functional element into the composite pane results from the selection according to the invention of thicknesses of the first laminating film and the second laminating film. This is advantageous in particular with the use of sensors since this improves the selective operability of a touch sensor from only one of the outer surfaces of the composite pane.

The sensor includes a carrier film with an electrically conductive coating, wherein in the electrically conductive coating, at least one capacitive switching region is isolated from the electrically conductive coating by at least one coating-free separating line. In an advantageous embodiment of the pane according to the invention, the width of the separating line is from 30 µm to 200 µm and preferably from 70 µm to 140 µm. Such thin separating lines allow reliable and sufficiently high electrical insulation and, at the same time, interfere only slightly or not at all with through-vision through the composite pane.

The capacitive switching region has a contact region, a supply line region, and a connection region. The supply line region electrically connects the contact region to the connection region, making the connection region electrically connectable to a sensor electronics system.

The switching region is a capacitive switching region, in other words, it is specially designed for capacitive contact detection. In an advantageous embodiment, the switching region forms a surface electrode. The capacitance of the surface electrode is measured via an external capacitive sensor electronics system. The capacitance of the surface electrode changes against ground when a body (for example, a human body), comes into its vicinity or, for example, touches an insulator layer above the surface electrode. The insulator layer comprises, in particular, the first pane as such. The capacitance change is measured by the sensor electronics system and when a threshold value is exceeded, a switching signal is triggered. The switching region is determined by the shape and size of the surface electrode.

The region of the electrically conductive layer that is arranged outside the capacitive switching region and is electrically isolated there from by the separating line, is referred to in the following as "surrounding region". The surrounding region can be connectable to the sensor electronics system via an additional connection region.

In such an arrangement, the capacitive switching region and the surrounding region form two electrodes that are capacitively coupled to one another. The capacitance of the capacitor formed by the electrodes changes with the approach of a body, for example, a human body part. The capacitance change is measured by an electronic sensor system and when a threshold value is exceeded, a switching signal is triggered. The sensitive region is determined by the shape and size of the region in which the electrodes are capacitively coupled.

The capacitive switching region according to the invention and, optionally, the surrounding region are integrated into the composite pane according to the invention. Thus, no switch or the like is necessary as a separate component that has to be attached to the composite pane. The composite pane preferably also has no other components that are arranged on its surfaces in the through-vision region. This is particularly advantageous in terms of a thin design of the composite pane and an only slight disruption of the vision through the composite pane.

An advantageous aspect of the invention comprises a pane arrangement having a composite pane according to the invention and an electronic sensor system that is electrically connected to the capacitive switching region via the connection region and, optionally, to the surrounding surface via another connection region. The sensor electronics system is a capacitive sensor electronics system.

In a possible embodiment of the switching arrangement according to the invention, the sensitivity of the sensor electronics system is selected such that when the contact region is touched by a human finger on the first pane, the sensor electronics system emits a switching signal and when the contact region is touched on the second pane, it emits no switching signal or a different switching signal. It is understood that the touching of the contact region can also be done with multiple fingers or a different human body part. In the context of this invention, "touching" means any interaction with the switching region that results in a measurable change in the measurement signal, i.e., here, the capacitance. In particular, this is touching of an outer surface of the composite pane zone produced by the orthogonal projection of the contact region onto the outer surface.

Additionally, or alternatively, the composite pane according to the invention itself already improves the selective switchability of the sensor. The sensor is embedded in the thermoplastic intermediate layer of the composite pane such that the electrically conductive coating of the carrier film points in the direction of the first pane. Triggering of the switching operation in the region of the orthogonal projection of the contact region onto the outer surface of the first pane is provided. If, for example, the operation of the sensor in a windshield from the vehicle interior is intended, the first pane is the inner pane of the composite pane facing the vehicle interior. If, on the other hand, the sensor is used as a rain sensor in motor vehicles, the first pane is the outer pane of the composite pane facing the vehicle surroundings. Since only a thin thermoplastic film (second laminating film) with a thickness of at most 70 μm lies between the first pane and the electrically conductive coating of the sensor, there is high sensitivity of the touch sensor from the first pane. The touch sensitivity of the sensor is further improved by the full-surface adhesion of the layers via the second laminating film. Situated between the carrier film of the sensor and the second pane is at least the first laminating film with a thickness of at least 0.3 mm as well as, optionally, an additional second laminating film.

The distance of the sensor arrangement from the outer surface of the second pane is thus, in any case, significantly greater than the distance from the outer surface of the first pane. As a result of this asymmetry according to the invention, selective switchability of the sensor is ensured. This effect can be described quantitatively using the respective surface capacitance on the sides of the first pane and the second pane.

The surface capacitance $c_1$ or $c_2$ is defined as the capacitance of a plate capacitor of that region of the composite pane resulting from orthogonal projection of the contact region between the contact region and the outer surface of the first pane or the outer surface of the second pane, with the resultant capacitance normalized over the area of the contact region. Here, the term "outer surface" means the surface of the composite pane that points outward, i.e., away from the composite pane. Accordingly, "inner surface" means the surface of the first or of the second pane that points into the interior of the composite pane and is areally connected to an intermediate layer.

The surface capacitance is thus the capacitance of the entire layer sequence (coating) normalized over the area (in particular over the aforementioned orthogonal projection area) between the electrically conductive layer and the respective outer surface of the composite pane.

The particular advantage of such a pane arrangement according to the invention resides in that the switching signal can be triggered only by touching the composite pane from one of the outer surfaces. In the case of a use of the pane arrangement in a motor vehicle window and installation of the composite pane with the first pane in the direction of the vehicle interior, it is possible, for example, to reliably avoid triggering the switching operation by individuals from the outside or an unintended triggering of the switching operation by rain or the movement of the windshield wiper, without using complicated measures such as additional full-surface laminating films or frame films. This was unexpected and surprising for the person skilled in the art.

According to the invention, the surface capacitance $c_1$ between the contact region and the outer surface of the first pane is greater than the surface capacitance $c_2$ between the contact region and the outer surface of the second pane. As discussed, this effect appears primarily through the selection according to the invention of the film thicknesses of the laminating films. Thus, the sensor can be operated selectively from the outer surface of the first pane.

In an advantageous embodiment of the composite pane according to the invention, the ratio of the surface capacitance $c_1$ to the surface capacitance $c_2$ is greater than or equal to 1.1:1, preferably greater than or equal to 1.2:1. For such ratios, touching the outer surface of the first pane can already be distinguished well from touching the outer surface of the second pane.

The size of the surface capacitance is a function not only of the layer thickness between the capacitive switching region and the outer surface considered, but also of the permeability of the interposed layers to electric fields. This is described by the relative permittivity of a material. The first pane and/or the second pane preferably have a relative permittivity of 2 to 8 and particularly preferably of 6 to 8. With such relative permittivities, it was possible to obtain a particularly good differentiation between touching the contact surface via the outer surface of the first pane compared to the outer surface of the second pane.

The first and the second laminating film preferably have a relative permittivity of 2 to 4 and particularly preferably of 2.1 to 2.9. With such permittivities, it was possible to obtain particularly good sensitivity of the orthogonally projected touch surface.

The sensitivity of the sensor electronic system can be determined as a function of the size of the contact region and as a function of the thickness of the substrate, intermediate layers, and cover pane in the context of simple experiments.

The carrier film according to the invention is preferably transparent. The carrier film preferably contains a polyester or is made of polyesters. It particularly preferably contains or is made of a polyethylene terephthalate (PET) film. The thickness of the carrier film is preferably from 0.025 mm to 0.1 mm. The carrier film preferably has a relative permittivity from 2 to 4 and particularly preferably from 2.7 to 3.3. With such thin carrier films, particularly good composite panes can be produced, since they contribute only slightly to a local increase in thickness. At the same time, good and selective switching signals can be produced. The electrically conductive coating according to the invention is preferably arranged on a surface of the carrier film, in other words, on precisely one of the two sides of the carrier film (i.e., on its front side or its back side).

The electrically conductive coating preferably includes a transparent, electrically conductive layer. Here, "transparent" means permeable to electromagnetic radiation, preferably electromagnetic radiation of a wavelength of 300 nm to 1300 nm and in particular to visible light.

Electrically conductive layers according to the invention are known, for example, from DE 20 2008 017 611 U1, EP 0 847 965 B1, or WO2012/052315 A1. They typically contain one or a plurality, for example, two, three, or four electrically conductive, functional layers. The functional layers preferably contain at least one metal, for example, silver, gold, copper, nickel, and/or chromium, or a metal alloy. The functional layers particularly preferably contain at least 90 wt.-% of the metal, in particular at least 99.9 wt.-% of the metal. The functional layers can be made of the metal or of the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, at least one dielectric layer is arranged, in each case, between two adjacent functional layers. Preferably, a further dielectric layer is arranged below the first and/or above the last functional layer. A dielectric layer includes at least one individual layer made of a dielectric material, for example, containing a nitride such as silicon nitride or an oxide such as aluminum oxide. However, the dielectric layer can also include a plurality of individual layers, for example, individual layers of a dielectric material, smoothing layers, matching layers, blocking layers, and/or anti-reflexion layers. The thickness of a dielectric layer is, for example, 10 nm to 200 nm.

This layer structure is, in general, obtained by a sequence of deposition operations that are carried out by a vacuum method such as magnetically-enhanced cathodic sputtering.

The electrically conductive coating can, in principle, be any layer that can be electrically contacted. If the pane according to the invention is intended to enable vision through it, as is, for example, the case in panes in the window sector, the electrically conductive coating is preferably transparent.

In an advantageous embodiment of a composite pane according to the invention, the electrically conductive coating is arranged set back from the edge of the composite pane by a width of 2 mm to 50 mm, preferably of 5 mm to 20 mm. The electrically conductive coating then has no contact with the atmosphere and is, in the interior of the composite pane, advantageously protected by the intermediate layers against damage and corrosion.

In an advantageous improvement of a composite pane according to the invention, the connection region is connected to a flat conductor and the flat conductor is routed out of the pane. The integrierte composite pane can then be particularly easily connected at the site of use to a voltage source and to a signal line that evaluates the switching signal of the sensor circuit, for example, in a vehicle via a CAN bus. Flat conductors, sometimes also called flexible foil conductors or flat ribbon conductors, are preferably made of a tinned copper strip with a thickness of 0.03 mm to 0.1 mm and a width of 2 mm to 16 mm. Copper has proven itself for such conductors since it has good electrical conductivity and good processability into foils. At the same time, the material costs are low. It is also possible to use other electrically conductive materials that can be processed into foils. Examples include aluminum, gold, silver, or tin and alloys thereof.

The first pane and/or the second pane preferably contain glass, particularly preferably flat glass, float glass, quartz glass, borosilicate glass, soda lime glass, or clear plastics, preferably rigid clear plastics, in particular polycarbonate, polymethyl methacrylate, and/or mixtures thereof. The first pane and/or the second pane are preferably transparent, in particular for use of the pane as a windshield or rear window of a vehicle or other uses in which high light transmittance is desirable. In the context of the invention, "transparent" means a pane having transmittance of more than 70% in the visible spectral range. However, for panes that are not situated in the traffic-relevant field of vision of the driver, for example, for roof panels, the transmittance can also be much lower, for example, greater than 5%.

The thickness of the first pane and/or of the second pane is between 0.3 mm and 25 mm, with pane thickness highly dependent on the application of the pane.

For applications in the field of building glazing, the pane thicknesses can, for example, have a thickness in the range from 2 mm to 10 mm.

Particularly in the automotive sector, there has been in recent years a trend toward increasingly lower glass thicknesses, enabling savings in terms of vehicle weight. The pane thicknesses of an automobile glazing, in particular a windshield are, for the inner pane, usually in the range from 0.3 mm to 2.5 mm and, for the outer pane, in the range from 0.8 mm to 2.5 mm. An asymmetric thickness combination, in which the thickness of the outer pane is greater than the thickness of the inner pane, is, especially with a low total thickness, advantageous in terms of improved stability of the composite pane. Whether the outer pane or the inner pane of the automobile glazing corresponds in its nomenclature to the first or to the second pane in the context of the invention depends on the positioning of the functional element in the intermediate layer.

In a preferred embodiment, the composite pane is a windshield, wherein the thickness of the outer pane is between 0.8 mm and 2.1 mm and the thickness of the inner pane is between 0.5 mm and 1.8 mm.

In another preferred embodiment of the invention, the composite pane is a roof panel of a motor vehicle, wherein the thickness of the outer pane is between 1.1 mm and 2.1 mm and the thickness of the inner pane is between 0.5 mm and 1.6 mm.

The composite glass is, in its embodiment as a vehicle glazing, preferably bent in one or more spatial directions, as is customary for motor vehicle panes, with typical radii of curvature in the range from approx. 10 cm to approx. 40 cm. The composite glass can, however, also be flat, for example, when it is intended as a pane for buses, trains, tractors, or as building glazing.

The first pane and/or the second pane can be thermally or chemically tempered, partially tempered, or non-tempered.

The composite glass can also be provided with an additional function, in that the thermoplastic intermediate layer has functional inclusions, for example, inclusions with IR absorbing, UV absorbing, coloring, or acoustic properties. The inclusions are, for example, organic or inorganic ions, compounds, aggregates, molecules, crystals, pigments, or dyes.

In particular with use of the composite pane according to the invention in vehicles, for example, as a windshield, it is advantageous to implement further functions in order to reduce the negative effects of weathering influences such as strong solar radiation or ice formation. For this, so-called low-E coatings and/or heatable coatings can be applied to the inner side of the inner pane or of the outer pane. Suitable material compositions of an electrically heatable coating that also functions as a low-E coating can be found, for example, in WO 2013/104439 and WO 2013/104438.

The invention is further accomplished by a method for producing a composite glass according to the invention, wherein
- a) an electrically switchable functional element is embedded between a first laminating film and a second laminating film
  or
  between a first laminating film and a second laminating film on one side and a further second laminating film on the other side,
- b) the thermoplastic intermediate layer with a functional element formed in step a) is placed on a second pane,
- c) the layer stack is completed with a first pane,
- d) the layer stack comprising, in this order, the first pane, the second laminating film, the functional element, optionally, a further second laminating film, the first laminating film, and the second pane is laminated to form a composite pane.

The method according to the invention offers the advantage that all components of the thermoplastic intermediate layer assembled in step a) can be placed together on the second pane in a single step.

If the composite glass is to function as bent vehicle glazing, at least the pane used as the outer pane is subjected to a bending process prior to lamination. In a preferred embodiment, the pane used as the inner pane is also subjected to a bending process. This is, in particular, advantageous in the case of strong bends in multiple spatial directions (so-called three-dimensional bends).

Alternatively, the pane used as the inner pane is not pre-bent. This is particularly advantageous in the case of panes with very low thicknesses since they have film-like flexibility and can thus be adapted to the pre-bent outer pane without having to be bent themselves.

The first and the second pane can be bent individually. Preferably, the panes are congruently bent together (i.e., simultaneously and by the same tool) since, thus, the shape of the panes is optimally matched to each other for the subsequent lamination.

The bonding of the first pane and the second pane in step d) is preferably done under the action of heat, vacuum, and/or pressure. Methods known per se for producing a composite pane can be used.

For example, so-called autoclave methods can be carried out at an elevated pressure of approx. 10 bar to 15 bar and temperatures from 130° C. to 145° C. over approx. 2 hours. Vacuum bag or vacuum ring methods known per se operate, for example, at approx. 200 mbar and 80° C. to 110° C. The first pane, the thermoplastic intermediate layer, and the second pane can also be pressed in a calender between at least one pair of rollers to form a pane. Systems of this type for producing panes are known and normally have at least one heating tunnel upstream before a pressing facility. The temperature during the pressing operation is, for example, from 40° C. to 150° C. Combinations of calender and autoclave processes have particularly proven their worth in practice. Alternatively, vacuum laminators can be used. These consist of one or a plurality of heatable and evacuable chambers, in which the first pane and the second pane are laminated within, for example, approx. 60 minutes at reduced pressures of 0.01 mbar to 800 mbar and temperatures from 80° C. to 170° C.

If the electrically switchable functional element is a sensor comprising a carrier film and an electrically conductive coating, the coating can be deposited on the carrier film prior to step a) by methods known per se. Reference is made by way of example to magnetron-enhanced cathodic sputtering. This is particularly advantageous in terms of simple, quick, economical, and uniform coating of the substrate. However, the electrically conductive coating can also be applied, for example, by vapor deposition, chemical vapor deposition (CVD), plasma-enhanced chemical vapor deposition (PECVD) or by wet chemical methods.

The de-coating of individual separating lines in the electrically conductive coating is preferably done by a laser beam. Methods for patterning thin metal films are known, for example, from EP 2 200 097 A1 or EP 2 139 049 A1. The width of the de-coating is preferably 10 μm to 1000 μm, particularly preferably 30 μm to 200 μm, and in particular 70 μm to 140 μm. In this range, a particularly clean and residue-free de-coating by the laser beam takes place. De-coating by laser beam is particularly advantageous since the de-coated lines are optically very inconspicuous and adversely impact the appearance and the through-vision only a little.

Another aspect of the invention includes the use of the composite pane according to the invention in buildings, in particular in the access area, window area, roof area, or façade area as a built-in part in furniture and appliances, in means of transportation for travel on land, in the air, or on water, in particular in trains, watercraft, and motor vehicles, for example, as a windshield, rear window, side window, and/or roof panel.

In the following, the invention is explained in detail with reference to drawings and exemplary embodiments. The drawings are schematic representations and not true to scale. The drawings in no way restrict the invention.

Figure 1B:
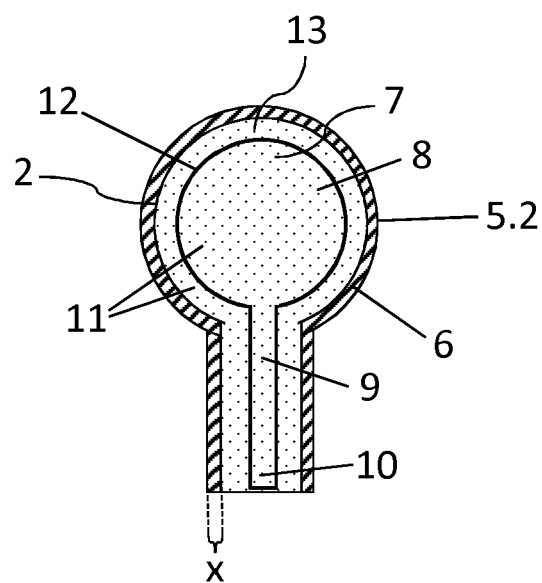
Figure 1C:
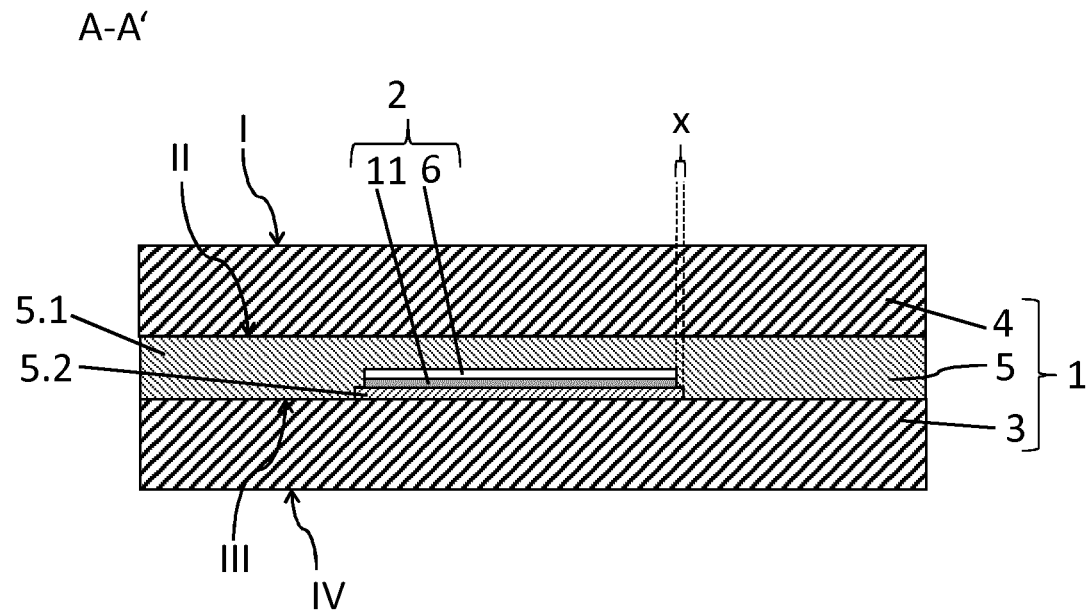
Figure 2:
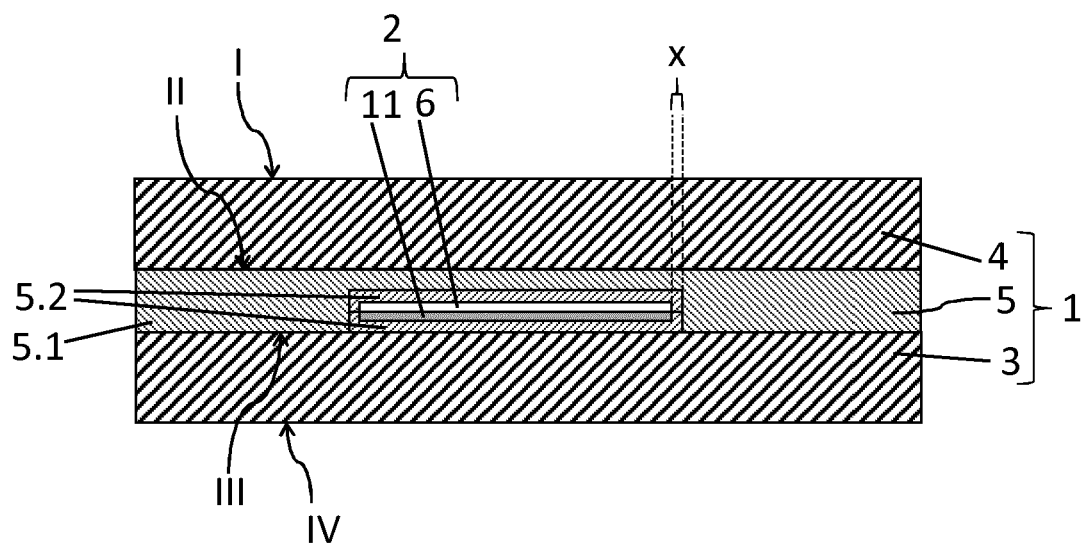
Figure 3:
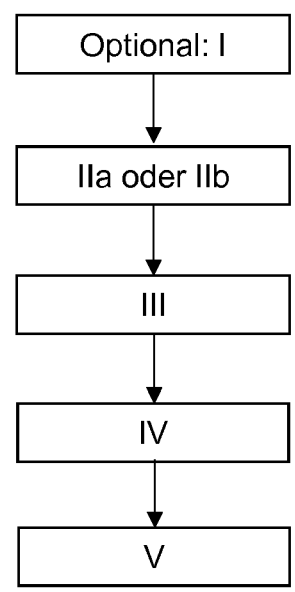

They depict:

FIG. 1a a plan view of a composite pane 1 according to the invention with an electrically switchable functional element 2, wherein the composite pane 1 is laminated areally with a first laminating film 5.1 and a second laminating film 5.2 is inserted in the region of the functional elements 2, FIG. 1b a detail of the composite pane 1 of FIG. 1a in the region of the functional element 2, FIG. 1c a cross-section through the composite pane 1 in the region of the functional element 2 along the section line AA' of FIG. 1a, FIG. 2 another embodiment according to the invention of the composite pane 1 depicted along the section line AA' analogous to FIG. 1c, FIG. 3 an embodiment of the method according to the invention.

FIG. 1a depicts a plan view of a composite pane 1 according to the invention with an electrically switchable functional element 2, wherein the composite pane 1 is laminated areally with a first laminating film 5.1 and a second laminating film 5.2 is inserted in the region of the functional element 2. FIG. 1b depicts a detail of the composite pane 1 of FIG. 1a in the region of the electrically switchable functional element 2. FIG. 1c shows a cross-section through the composite pane 1 of FIG. 1a in the region of the functional element 2, wherein the cross-section is along the section line AA'. The composite pane 1 is intended for use as a windshield of a motor vehicle and comprises a first pane 3, which, here, represents the inner pane of the windshield, and a second pane 4 (here: outer pane of the windshield). The panes 3, 4 are laminated to one another via a thermoplastic intermediate layer 5. The thermoplastic intermediate layer 5 consists of a first laminating film 5.1, which is applied full-surface, and a second laminating film 5.2, which is present only locally in the region of the electrically switchable functional element 2. The first pane 3 has an outer surface IV and an inner surface III. The second pane 4 has an inner surface II and an outer surface I. The thermoplastic intermediate layer 5 joins the inner surface III of the first pane 3 and the inner surface II of the second pane 4. The second pane 4 and the first pane 3 are made of soda lime glass. The first laminating film 5.1 is a thermoplastic film, here, a polyvinyl butyral film with a thickness of 0.76 mm measured before the lamination operation. The second laminating film 5.2 is likewise a thermoplastic polyvinyl butyral film, which, in contrast to the first laminating film 5.1, is substantially plasticizer-free and has a thickness of 50 μm (before the laminating operation). The layer sequence of the composite pane 1 in the region outside the functional element 2 consists according to FIG. 1c of the first pane 3, the first laminating film 5.1, and the second pane 4. This is particularly advantageous since by using only a single film element, the structure is reduced to the essential, no slippage of film plies against one another occurs during the production process, and a weight reduction is obtained compared to full-surface multiple-ply intermediate layers. In the region of the functional element 2, the layer sequence of the composite pane 1 consists of the first pane 3, the second laminating film 5.2 applied on the inner surface III of the first pane 3, the functional element 2, the first laminating film 5.1, and, finally, the second pane 4, whose inner surface II rests against the first laminating film 5.1. The second laminating film 5.2 thus effects a bonding of the functional element 2 to the inner surface III of the first pane 3, wherein no air inclusions at all occur due to the good adhesion of the second laminating film to the adjacent pane. The appearance of the composite pane is thus significantly improved. Moreover, the edge appearance of the functional element 2 is concealed by the second laminating film 5.2 when looking through the composite pane 1 from the side of the first pane 3 (here: inner pane of the vehicle glazing). This also contributes decisively to an attractive appearance and an inconspicuous integration of the functional element 2. The second laminating film 5.2 has an overhang of 3.0 mm beyond the outline of the functional element. Thus, it can be ensured that even with a slight shifting of the film components in the unlaminated stack, there is still complete coverage of the functional element 2 by the second laminating film 5.2. Moreover, the inventors were able to establish that an overhang x of the second laminating film astonishingly results in a further decisive improvement of the edge appearance compared to a congruent arrangement. The functional element 2 is, according to FIGS. 1a, 1b, and 1c, a touch sensor and comprises a carrier film 6 on which an electrically conductive coating 11 is applied. This is divided by a coating-free separating line 12 into a capacitive switching region 7 and a surrounding region 13 (see FIG. 1b). The capacitive switching region 7 comprises a contact region 8, in which the operation of the touch sensor is provided, a connection region 10, which serves for connection to a capacitive sensor electronics system by means of an electric conductor (both not shown), and a supply line region 9, which connects the contact region 8 to the connection region 10. The carrier film has a thickness of 50 μm. The functional element 2 is inserted into the thermoplastic intermediate layer 5 such that the electrically conductive coating 11 points in the direction of the inner surface III of the first pane 3 and is bonded thereto by the second laminating film 5.2. The use of a touch sensor as an electrically switchable functional element 2 is particularly advantageous in connection with the composite pane 1 according to the invention since, as a result of the asymmetric thicknesses of the thermoplastic intermediate layer 5 above and below the functional element, the selective operability of the sensor is improved. Surprisingly, the inventors were able to establish that the composite pane 1 according to the invention has no increased susceptibility to mechanical damage during the production process since the compressive stresses in the region of the laminated-in functional element could be kept low.

FIG. 2 depicts another embodiment according to the invention of the composite pane 1, wherein FIG. 2 shows a cross-section through a composite pane analogous to the section line AA' depicted in FIG. 1a. The basic structure corresponds to that shown in FIG. 1c. In contrast to the embodiment of FIG. 1c, in FIG. 2, an additional second laminating film 5.2 is inserted between the functional element 2 and the first laminating film 5.1. The layer structure in the region of the functional elements 2 accordingly consists of the first pane 3, a second laminating film 5.2, the functional element 2, a further second laminating film 5.2, the first laminating film 5.1, and the second pane 4. The essential advantages of the composite pane of FIG. 2 correspond to those described for FIGS. 1a, 1b, and 1c. In addition thereto, according to the structure of FIG. 2, a further improvement of the edge appearance of the functional element 2 can be obtained, in particular when looking down at the outer surface I of the second pane 4. Also, in the embodiment according to FIG. 2, an overhang x of only one or even of both of the second laminating films 5.2 beyond the functional element 2 can be provided. The two second laminating films 5.2 can even have a mutually different overhang x beyond the functional element 2. FIG. 2 depicts a common circumferential overhang x=1.0 mm of both second laminating films 5.2 beyond the functional element 2. This results, as described, in a further substantial improvement of the edge appearance.

FIG. 3 depicts an embodiment of the method according to the invention comprising the steps:

I Optionally: Joint congruent bending of the second pane 4 and of the first pane 3, IIa Insertion of an electrically switchable functional element 2 between a first laminating film 5.1 and a second laminating film 5.2 or

IIb Insertion of an electrically switchable functional element 2 between a first laminating film 5.1 and a second laminating film 5.2 on one surface of the functional element 2 and a further second laminating film 5.2 on the opposite surface of the functional element 2, III Placing the thermoplastic intermediate layer 5 formed in step IIa or IIb on a second pane 4, IV Completing the layer stack with a first pane 3, V Laminating a composite pane 1 comprising, in this order, the first pane 3, a second laminating film 5.2, the functional element 2, optionally, a further second laminating film 5.2, the first laminating film 5.1, and second pane 4 to form a composite pane 1.

LIST OF REFERENCE CHARACTERS (1) composite pane
(2) functional element (3) first pane
(4) second pane
(5) thermoplastic intermediate layer
(5.1) first laminating film
(5.2) second laminating film
(6) carrier film
(7) capacitive switching region
(8) contact region
(9) supply line region
(10) connection region
(11) electrically conductive coating
(12) coating-free separating line
(13) surrounding region
AA' section line
x overhang of the second laminating films 5.2 beyond the functional element 2
I outer surface of the second pane 4
II inner surface of the second pane 4
III inner surface of the first pane 3
IV outer surface of the first pane 3

The invention claimed is:

1. A composite pane with at least one electrically switchable functional element, comprising:
a first pane,
a second pane,
a thermoplastic intermediate layer joining the first pane to the second pane and comprising a first laminating film with a thickness of at least 0.3 mm and at least one second laminating film with a thickness in each case of at most 70 μm,
wherein
the first laminating film is inserted substantially areally between the first pane and the second pane,
the at least one second laminating film is inserted exclusively in a region of the at least one electrically switchable functional element and protrudes with an overhang x of at least 1 mm and at most 10 mm beyond all outer lateral edges of the electrically switchable functional element that are covered by the first laminating film,
a direct layer sequence in the region of an electrically switchable functional element consists of the first pane, the second laminating film, the electrically switchable functional element, optionally, a further second laminating film, the first laminating film, and the second pane, and
the functional element has a thickness of at most 200 μm and has a share of the total area of the glazing of less than 10%, and
wherein the electrically switchable functional element is an antenna, an SPD, a PDLC, an electrochromic, or an electroluminescent functional element, or
a sensor which comprises a carrier film with an electrically conductive coating, wherein at least one capacitive switching region in the electrically conductive coating is separated from the electrically conductive coating by at least one coating-free separating line, wherein the at least one second laminating film protrudes with said overhang x of at least 1 mm and at most 10 mm beyond all outer lateral edges of the carrier film that are covered by the first laminating film,
wherein the at least one second laminating film has a plasticizer content that is less than a plasticizer content of the first laminating film, and
wherein each of the first and second laminating films is a thermoplastic laminating film of polyvinyl butyral (PVB), a thermoplastic laminating film of ethylene vinyl acetate (EVA), or a thermoplastic laminating film of polyurethane (PU).

2. The composite pane according to claim 1, wherein a direct layer sequence in a region of the field of vision of the composite pane, which lies outside the at least one electrically switchable functional element or the functional elements and outside the overhang x, consists of the first pane, the first laminating film, and the second pane.

3. The composite pane according to claim 1, wherein the thermoplastic intermediate layer consists of the first laminating film and in each case one second laminating film per electrically switchable functional element that is inserted into the intermediate layer, and the direct layer sequence in the region of the electrically switchable functional elements consists of the first pane, the second laminating film, the electrically switchable functional element, the first laminating film, and the second pane.

4. The composite pane according to claim 1, wherein the thermoplastic intermediate layer consists of the first laminating film and in each case two second laminating films per electrically switchable functional element that is inserted into the intermediate layer, and the direct layer sequence in the region of the electrically switchable functional element consists of the first pane, a second laminating film, the electrically switchable functional element, a further second laminating film, the first laminating film, and the second pane.

5. The composite pane according to claim 1, wherein the first laminating film and the second laminating film are suitable for producing an adhesive bond to one another and to adjacent panes and/or to adjacent functional elements.

6. The composite pane according to claim 1, wherein the at least one second laminating film includes a plasticizer content of less than 15 wt.

7. The composite pane according to claim 1, wherein the at least one second laminating film has a thickness of 10 μm to 70 μm, and the first laminating film has a thickness of 0.30 mm to 1.5 mm.

8. The composite pane according to claim 1, wherein the at least one second laminating film protrudes 1 mm to 5 mm beyond the functional element.

9. The composite pane according to claim 1, wherein the capacitive switching region of the sensor has a contact region, a supply line region, and a connection region, the supply line region electrically connects the contact region to the connection region; and the connection region is electrically connectable to a sensor electronics system.

10. The composite pane according to claim 9, wherein a surface capacitance between the contact region and the outer surface of the first pane is greater than a surface capacitance $c_A$ between the contact region and the outer surface of the second pane.

11. A method for producing a composite pane according to claim 1, comprising
a. embedding an electrically switchable functional element between a first laminating film and a second laminating film
or
between a first laminating film and a second laminating film on one side and a further second laminating film on the opposite side,
b. placing the thermoplastic intermediate layer with a functional element formed in step a) on a second pane,
c. the layer stack is completed with a first pane,
d. the layer stack comprising, in this order, the first pane, the second laminating film, the functional element, optionally, a further second laminating film, the first laminating film, and the second pane is laminated to form a composite pane.

12. The method according to claim 11, wherein before step b) an electrical supply line is electrically conductingly connected to the functional element and is routed out of the thermoplastic intermediate layer.

13. A method comprising utilizing a composite pane according to claim 1 as a vehicle glazing.

14. The composite pane according to claim 6, wherein the at least one second laminating film includes a plasticizer content of less than 5 wt.-%.

15. The composite pane according to claim 6, wherein the at least one second laminating film is substantially plasticizer-free.

16. The composite pane according to claim 8, wherein the at least one second laminating film protrudes 2 mm to 3 mm beyond the functional element.

17. The method according to claim 13, wherein the vehicle glazing is a windshield, roof panel, side window, or rear window.

18. The composite pane according to claim 1, wherein the plasticizer content of the at least one second laminating film is less than 5 wt.-% and the plasticizer content of the first laminating film is at least 15 wt.-%.

19. The composite pane according to claim 18, wherein both the first laminating film and the at least one second laminating film is a thermoplastic laminating film of polyvinyl butyral (PVB).

20. The composite pane according to claim 18, wherein the at least one second laminating film is plasticizer free.

* * * * *